United States Patent
Yamaguchi et al.

(10) Patent No.: US 6,441,860 B1
(45) Date of Patent: Aug. 27, 2002

(54) VIDEO SIGNAL PROCESSING APPARATUS

(75) Inventors: Takashi Yamaguchi, Ibaraki; Yutaka Nio, Osaka; Toshiaki Kitahara, Ibaraki, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/852,388

(22) Filed: May 7, 1997

(30) Foreign Application Priority Data

May 7, 1996 (JP) ............................................. 8-112461

(51) Int. Cl.$^7$ ................................................. H04N 7/01
(52) U.S. Cl. ........................................ 348/555; 348/721
(58) Field of Search ................................ 348/725, 552, 348/441, 442, 443, 444, 445, 453, 454, 458, 459, 721, 555; H04N 7/01, 5/44, 5/46

(56) References Cited

U.S. PATENT DOCUMENTS

| | | | |
|---|---|---|---|
| 4,797,746 A | | 1/1989 | Ashcraft |
| 5,459,526 A | * | 10/1995 | Yamada ....................... 348/555 |
| 5,703,658 A | * | 12/1997 | Tsuru et al. ................. 348/555 |
| 5,740,092 A | * | 4/1998 | Miyake et al. ............... 348/555 |
| 5,751,374 A | * | 5/1998 | Ninomiya et al. ........... 348/555 |
| 5,982,449 A | * | 11/1999 | Nagai et al. ................. 348/555 |

FOREIGN PATENT DOCUMENTS

| | | | | |
|---|---|---|---|---|
| DE | 42 33 368 | | 4/1993 | |
| EP | 0 444 341 | | 9/1991 | |
| EP | 0 444 368 | | 9/1991 | |
| EP | 0 529 442 | | 3/1993 | |
| EP | 0 574 901 | | 12/1993 | |
| EP | 0 587 130 | | 3/1994 | |
| EP | 0 710 016 | | 5/1996 | |
| GB | 2172466 | * | 9/1986 | ............ H04N/9/64 |
| JP | 4-256294 | * | 9/1992 | ............ H04N/5/46 |
| JP | 7-334141 | * | 12/1995 | |
| JP | 8-9343 | * | 1/1996 | ............ H04N/7/01 |

OTHER PUBLICATIONS

Schreiber, William F, "6–MHZ Single–Channel HDTV Systems", HDTV Symposium, Ottawa, Oct. 1987.*

* cited by examiner

Primary Examiner—David E. Harvey
(74) Attorney, Agent, or Firm—RatnerPrestia

(57) ABSTRACT

A video signal processing apparatus which can process video signals with different formats simply by switching between programs for processing video signals. Different system clock signals are sent to the input and output processes by employing a programmable signal processor 4, input synchronizing signal processor 8, programmable signal processor 6 and output synchronizing pulse processor 9. A method for processing the video signal can be flexibly changed simply by switching between signal processing programs for programmable signal processors. In addition, the use of a memory 5 enables the signal, which is processed using the system clock signal in the input process, to be processed using the system clock signal in the output process. The present invention thus allows the processing of video signals with many different signal formats. The design of efficient circuitry will greatly reduce costs and production processes.

9 Claims, 6 Drawing Sheets

VIDEO SIGNAL PROCESSING APPARATUS

FIELD OF THE INVENTION

The present invention relates to the field of video signal processing apparatus which regenerates and decodes video signals employing a programmable signal processor.

BACKGROUND OF THE INVENTION

The specifications of broadcasting system for television signals are becoming increasingly diverse. At present, NTSC broadcasting systems via broadcast satellite and communications satellite, high definition television broadcasting, and digital television broadcasting are already in operation, in addition to existing terrestrial television broadcasting in NTSC color format (hereafter referred to as NTSC television broadcasting).

As the specifications of broadcasting systems continue to diversify, television sets require the corresponding ability to receive television signals broadcast via a range of broadcasting systems. In addition, as information processing devices such as personal computers become increasingly popular, display performance of so-called VGA-class (Video Graphics Array) resolution is required for home-use television sets.

Conventionally, television signals from different broadcasting systems are received and processed by switching field frequency, resolution, and number of horizontal scanning lines for each system, and this has resulted in larger and more complicated circuits.

For example, FIG. 6 shows a block diagram of a television set designed to receive both NTSC television composite video signals and MUSE television composite video signals.

NTSC television composite video signals are received as follows. A tuner selects a channel for NTSC television composite video signals. Signals are amplified by a VIF (Video Intermediate Frequency) amplifier and then detected by a detector to generate baseband NTSC TV composite video signals. Baseband NTSC TV composite video signals are input to an input terminal 72 in FIG. 6. A clamping circuit 82 adjusts the DC level of the baseband NTSC television composite video signals to an appropriate level, and an analog-to-digital converter 83 quantizes the resultant baseband NTSC television composite video signals and converts them to digital signals. Sampling frequency for quantization is phase-locked to the color subcarrier and has a four times (hereafter referred to as 4 fsc) higher frequency than the color subcarrier: approximately 14 MHz. Digitized baseband NTSC TV composite video signals are fed to a NTSC video signal decoder 76N.

On the other hand, a synchronizing signal regenerator 75 for NTSC TV composite video signals regenerates a clock signal $\phi 81$, phase-locked to the color subcarrier, from quantized and digitized baseband NTSC TV composite video signals with a resonance circuit comprising a crystal resonator 102. The synchronizing signal regenerator 75 also detects synchronizing signal components of quantized and digitized NTSC composite video signals with the clock signal $\phi 81$, regenerates horizontal synchronizing signals and vertical synchronizing signals, and generates the required pulse signals such as a clock signal $\phi 82$ phase-locked to input horizontal synchronizing signals and a clamp pulse. The NTSC TV composite video signal decoder 76N decodes NTSC TV composite video signals through a luminance signal process and a chrominance signal process using a range of signals including clock signal $\phi 81$, clock signal $\phi 82$, and horizontal synchronizing signals.

The 2nd phase extended definition television standard (ED2) baseband composite video signal decoder 76E regenerates horizontal high-emphasis processing signals from ED2 composite video signals, in addition to decoding by 76N, using the clock signals $\phi 81$, clock signals phased-locked to $\phi 81$, and synchronizing signals. Video signals after the above processing are sampled by a clock signal $\phi 83$ synchronized with the horizontal synchronizing pulse and vertical synchronizing pulse of the output circuit for synchronizing video signals with the horizontal synchronizing pulse and vertical synchronizing pulse of the output circuit. The clock signal $\phi 83$ is generated from a resonance circuit comprising a crystal resonator 103, and is synchronized with the horizontal synchronizing pulse and vertical synchronizing pulse of the output circuit. For ED2 composite video signals, after the abovementioned processing, a vertical high-emphasis processing signal is regenerated using the clock signal $\phi 83$ and a clock signal phase-locked to $\phi 83$.

At this point, the luminance signal process in 76N and the luminance signal process in 76E can be combined to share a common circuit, as can the chrominance signal process in 76N and the chrominance signal process in 76E.

The method for decoding MUSE television composite video signals is as follows. A tuner selects a channel, and the VIF (video intermediate frequency) circuit amplifies the signals received. The detector detects the waveform and generates baseband MUSE television composite video signals. Baseband MUSE TV composite video signals are input to an input terminal 71. A clamping circuit 92 adjusts the DC level of baseband MUSE television composite video signals to appropriate level, and an analog-to-digital converter 93 quantizes baseband MUSE television composite video signals and converts them to digital composite video signals. A clock signal which is phase-locked to the horizontal phase standard signal and is about 16.2 MHz is used as sampling frequency for quantization. Digitized MUSE TV composite video signals are fed to a MUSE TV composite video signal decoder 74. The decoder 74 regenerates wide-band high definition video signals by approximately interpolating untransmitted signals of sampling points employing infield interpolation, inframe interpolation, or interframe interpolation.

A synchronizing signal regenerator 73 for MUSE television composite video signals regenerates horizontal phase standard signals, horizontal synchronizing signals, vertical phase standard signals, and vertical synchronizing signals from MUSE composite video signals. In addition, the synchronizing signal regenerator 73 regenerates a clock signal $\phi 91$ required for operating the MUSE composite video signal decoder, from a resonance circuit comprising a crystal resonator 100, and generates a range of control signals for the input signal. Moreover, for MUSE composite video signals, video signals of horizontal scanning period are compressed to 11/12 for transmission, requiring the decoder to decompress them. For this purpose, a clock signal $\phi 93$, phase-locked to the horizontal scanning pulse of the display apparatus, whose frequency is about 44 MHz, is generated from the resonance circuit comprising the crystal resonator 101. At the final stage of decoding process for MUSE composite video signals, decoded video signals are sampled by the clock signal $\phi 93$ of about 44 MHz, and synchronized with the horizontal scanning pulse. The digital-to-analog converters 87 and 97 convert each of the outputs of the NTSC television composite video signal decoder 76N, the ED2 composite video signal decoder 76E, and the MUSE television composite video signal decoder 74 to analog signals. The switching circuit 80 selects and outputs signals.

At the same time, the switching circuit 79 also selects and outputs synchronizing signals.

SUMMARY OF THE INVENTION

The present invention relates to a video signal processing apparatus for regenerating and decoding video signals employing programmable signal processors.

In general, an exclusive decoder, synchronizing regenerator, and clock generator are required for decoding input television video signals of each signal standard. This has resulted in larger circuits and also disadvantages in cost and productivity.

The object of the present invention is to provide solutions to the above disadvantages.

(1) The present invention relates to a video signal processing apparatus employing a synchronizing signal processor for separating and processing the synchronizing signal from the composite video signal, a clock signal generator for generating the clock signal phase-locked to the horizontal phase standard signal in the video signal, a first programmable signal processor for decoding the video signal, a storage means for storing the output signal of the first programmable signal processor, a generating and processing means of the output synchronizing pulse for generating and processing the synchronizing pulse so as to display the video signal on the display apparatus, a memory for storing multiple programs which are used for processing the video signal after the first decoding step by said first programmable signal processor at receiving the output signal from said storage, and a control means for selecting and reading out a suitable program from the memory where the multiple programs are stored.

The present invention enables one video display apparatus to process signals with different formats by overwriting an operating program of the programmable signal processor depending on the format of the input composite video signal, and thus provides cost-efficient video signal processing apparatus with higher productivity.

(2) The present invention also relates to a video signal processing apparatus employing a synchronizing signal separator for separating the synchronizing signal from the composite video signal, a clock signal generator for generating the clock signal phase-locked to the horizontal phase standard signal in said video signal, a first programmable signal processor for decoding said video signal, a storage means for storing the output signal of the first programmable signal processor, a generating and processing means of the synchronizing pulse for generating and processing the output synchronizing pulse so as to display the video signal on a display apparatus, and a control means for selecting and reading out a suitable program from the memory for processing the video signal after the first decoding step by said first programmable signal processor at receiving the output signal from said storage means.

The present invention enables one device to process signals of many different formats by switching programmable processors and clock signal generators depending on the format of the input composite video signal.

(3) The present invention also relates to a video signal decoder which generates a clock signal phase-locked to an external input synchronizing signal which is unlocked to a first composite video signal, and employs a first clock signal generator for phase-locking said clock signal to the synchronizing pulse φ21 for displaying an image on a display apparatus. For displaying two video signals with different signal formats on the same screen, a first synchronizing signal is separated from a first composite video signal, and a clock signal for a second video composite signal is generated from an external synchronizing signal so as to generate a pulse for displaying a second video composite signal.

By reading out and displaying the first and second video signals stored in the memory after synchronizing them to the same clock signal, i.e., a clock signal phase-locked to the synchronizing pulse for displaying the video signal, an entire or a part of video signals with two different signal formats can be displayed on the same screen.

(4) The present invention also relates to a video signal decoder employing a clock signal generator for generating the clock signal phase-locked to the horizontal phase standard signal in the input composite video signal, another clock signal generator for generating the clock signal phase-locked to the synchronizing pulse for driving a display apparatus so as to display the video signal on the screen, and a Voltage Controlled Oscillator (VCO) which enables each clock signal generator to output different frequency signals. The VCO enables to output wideband frequency depending on the format of the input video signal.

(5) The present invention relates to a video signal processing apparatus comprising a CRT as an apparatus for displaying the composite video signal. The invention employs a second programmable signal processor for reading out the composite video signal stored in the memory with reference to the synchronizing signal generated from a synchronizing pulse generator for displaying decoded composite video signals, a memory which stores multiple programs for controlling said second programmable signal processor, and a control means for selecting and reading out a program stored in said memory depending on the format of the input video signal and writing in the selected program to a memory of the programmable processor. This enables the programmable processor to select required deflection process corresponding to the format of the video signal to be displayed with reference to the synchronizing pulse for displaying the video signal, and thus realizes one apparatus to handle multiple display formats.

DESCRIPTION OF THE PREFERRED EMBODIMENTS

Figure 1:
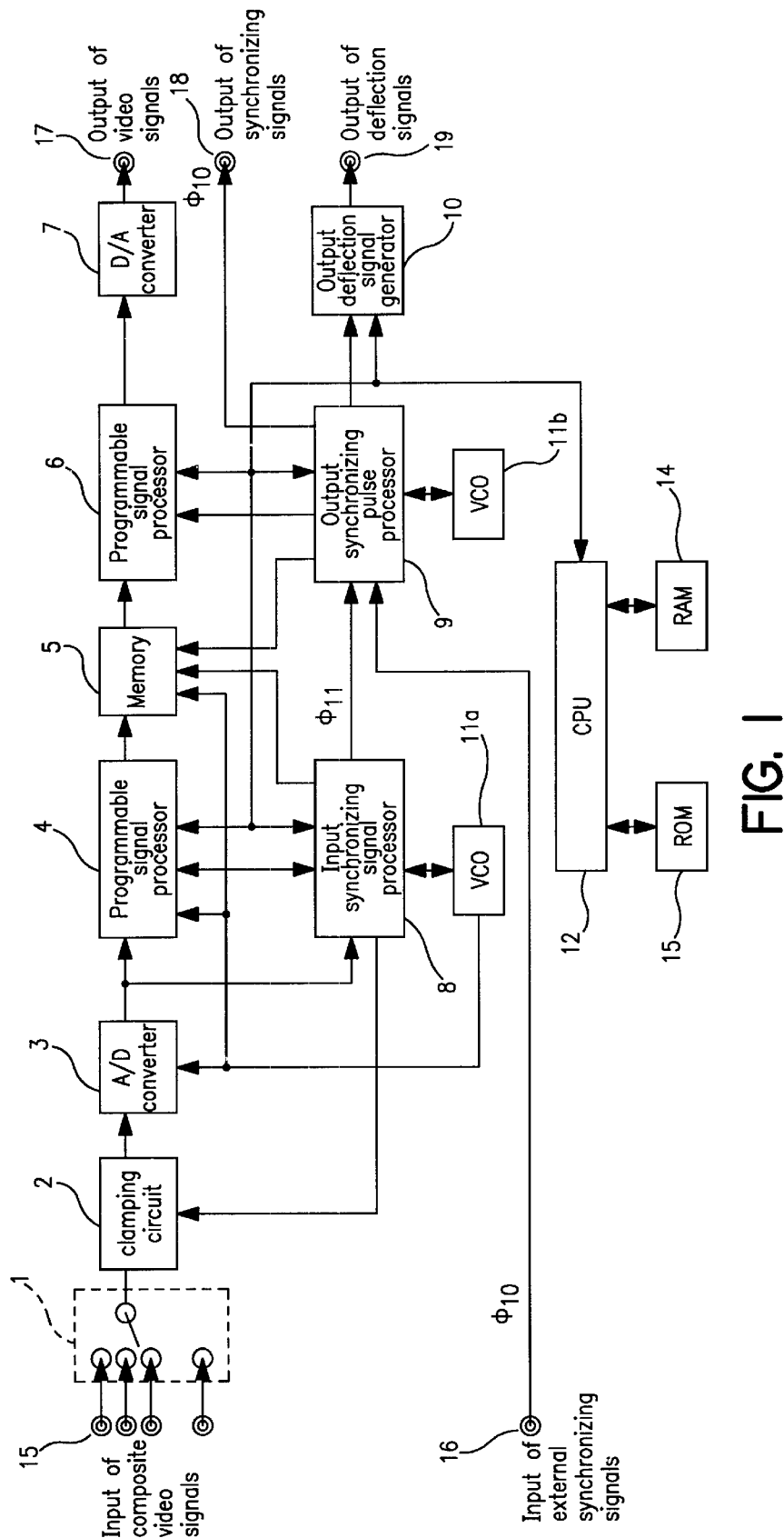
FIG. 1 is a block diagram of a video signal processing apparatus of the present invention.

FIG. 1 is a block diagram of a video signal processing apparatus of the present invention. The invention is intended for a wide range of input composite video signals (including synchronizing signals) such as MUSE TV composite video signals, NTSC TV composite video signals, and high definition baseband TV composite signals.

A signal selector 1 selects a video signal, a clamping circuit 2 adjusts the DC level, and an analog-to-digital converter 3 converts the video signal to a digital video signal. The digital video signal is then supplied to a first programmable signal processor 4 and an input synchronizing signal processor 8. The input synchronizing signal processor 8 separates and regenerates the synchronizing signal from the input video signal and also generates a clock signal phase-locked to the horizontal phase standard signal of the input video signal.

Figure 2:
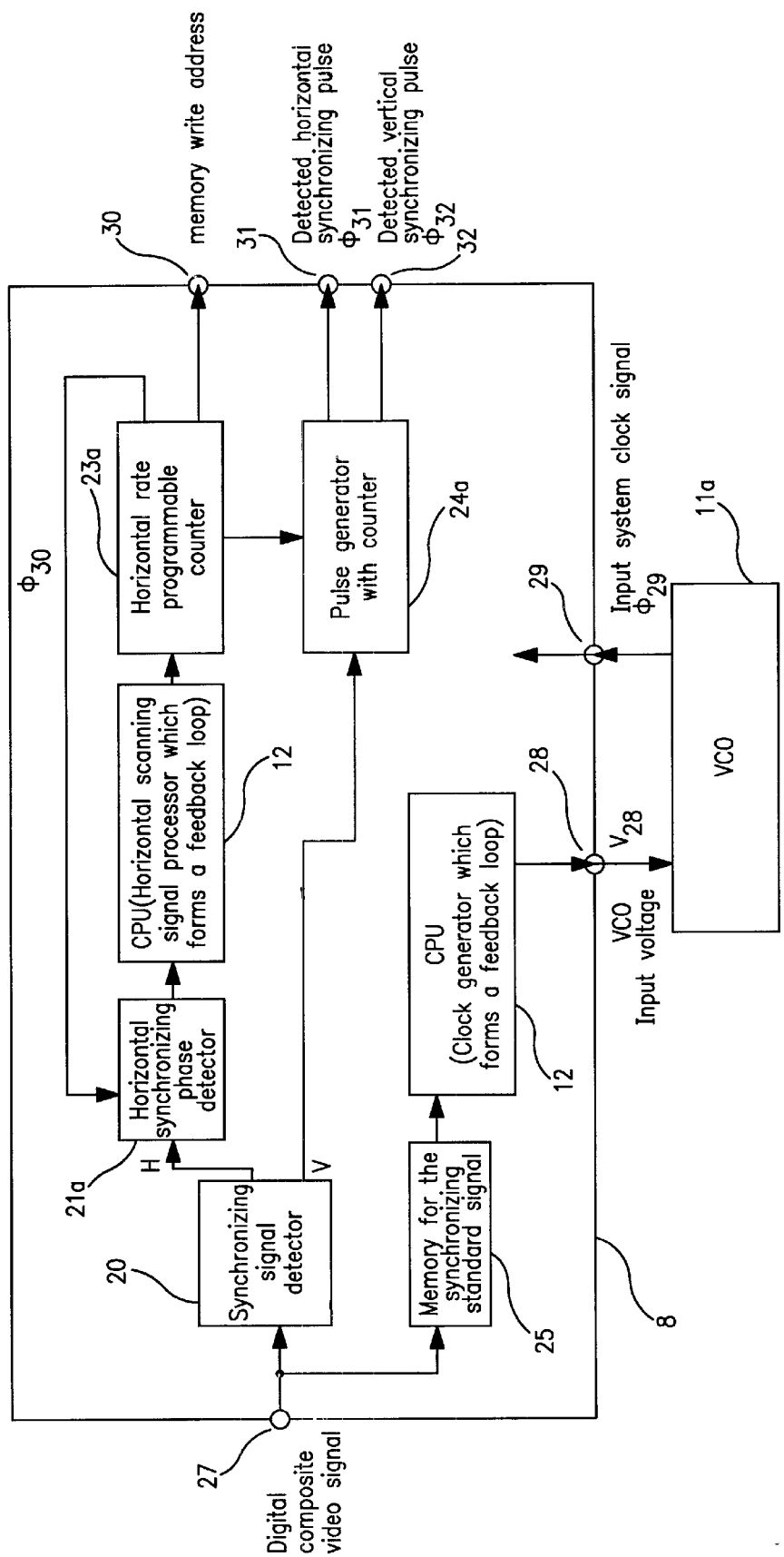
FIG. 2 is a block diagram of an input synchronizing signal processor of the video signal processing apparatus in FIG. 1.

FIG. 2 is a block diagram of the input synchronizing signal processor 8. The input synchronizing signal processor 8 comprises a programmable counter in order to process multiple input composite video signals. Such processor can be provided with a structure to switch functions and operations of each block according to multiple input composite video signals. First, a synchronizing signal detector 20 separates the horizontal synchronizing signal component and vertical synchronizing signal component from the digital video signal. For NTSC TV composite video signals, the DC level of the synchronizing signal is specified to be lower than the black level of the video signal. Therefore, horizontal and vertical synchronizing signal components are separable by integrating the output after slicing based on the appropriate slice level setting in a synchronizing signal separator. For MUSE TV composite video signals, a frame synchronizing pulse, which is the vertical synchronizing signal component, is detectable by autocorrelation with time. The horizontal synchronizing signal component is separable by a counter activated by said frame synchronizing pulse.

A digital composite video signal is input to the memory 25 for the synchronizing standard signal. In the case of MUSE TV composite video signals, the memory 25 extracts the waveform of the horizontal phase standard signal mixed in the composite video signal. In the case of NTSC TV composite video signals, the memory extracts a color burst signal for regenerating color subcarrier. The extracted digital signal waveform is sent to a CPU 12. Via the operation of a loop filter, the input voltage V28 to be applied to the input voltage terminal 28 of a VCO is calculated by the CPU and supplied to a VCO 11a to form a feedback loop.

The VCO 11a is a wideband variable clock generator controlled by DC voltage, and is capable of generating a wideband clock pulse, for example, about 32 MHz for MUSE TV composite video signals, 28 MHz for NTSC TV composite video signals, and 50 MHz for VGA (Video Graphics Array) employing, for example, a positive feedback oscillator as an oscillation source.

The output clock pulse $\phi 29$ of the VCO 11a is sent to the analog-to-digital converter 3, the programmable processor 4, and the input synchronizing signal processor 8, and used as a system clock pulse.

The output horizontal synchronizing pulse from the synchronizing signal detector 20 is not used as it is, and requires to be stabilized using a feedback loop in order to process non-standard NTSC composite video signals such as reconstruction signals of the VTR. A horizontal synchronizing phase detector 21a detects any phase error between the generated horizontal synchronizing pulse and the horizontal synchronizing signal detected by the horizontal synchronizing phase detector 21a. The detection result is sent to the CPU 12 for calculating the dividing ratio to be used for a horizontal rate programmable counter 23a to cancel the phase error. The CPU 12 sends the calculation result to the horizontal rate programmable counter 23a to form a feedback loop. Said calculation result indicates the number of input system clock pulses in one horizontal scanning period. The divided output of said horizontal rate programmable counter 23 is sent to a memory 5 as a write address. Any phase error below the cycle frequency of the system clock is detected by the CPU 12 as a horizontal skew, and such phase error can be absorbed by applying a phase correction which cancels the skew in the programmable processor 4.

In addition, the pulse generating counter 24a adjusts the divided output of the horizontal rate programmable counter 23a to the required phase and pulse width, and sends it to an output synchronizing pulse processor 9 as a detected horizontal synchronizing pulse $\phi 31$. The pulse generating counter 24a also adjusts the vertical synchronizing signal detected by the synchronizing signal detector 20 in FIG. 2 to the required phase and pulse width, and outputs it as a detected vertical synchronizing pulse $\phi 32$.

Figure 5:
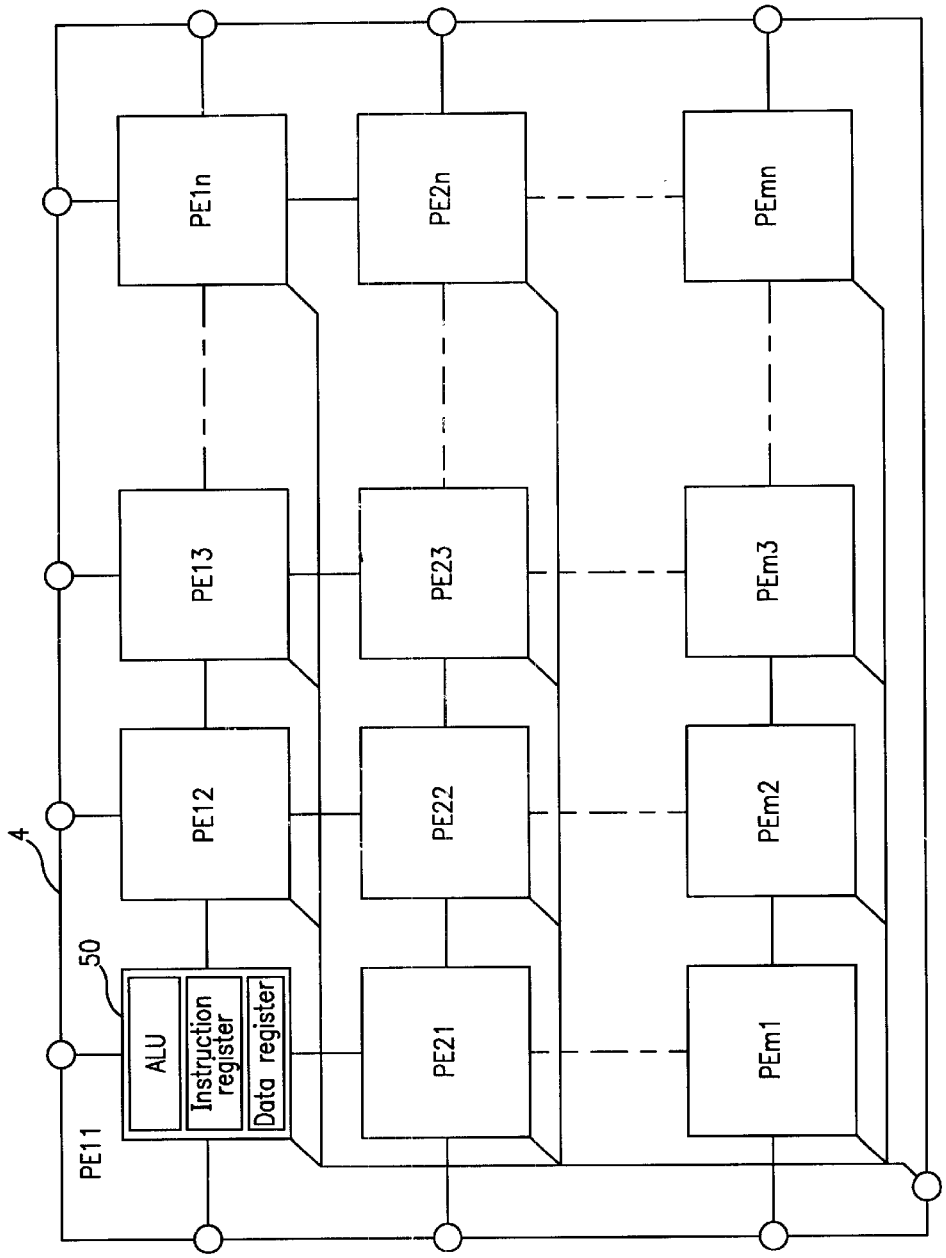
FIG. 5 is a block diagram of a programmable signal processor of the video signal processing apparatus in FIG. 1.
Figure 6:
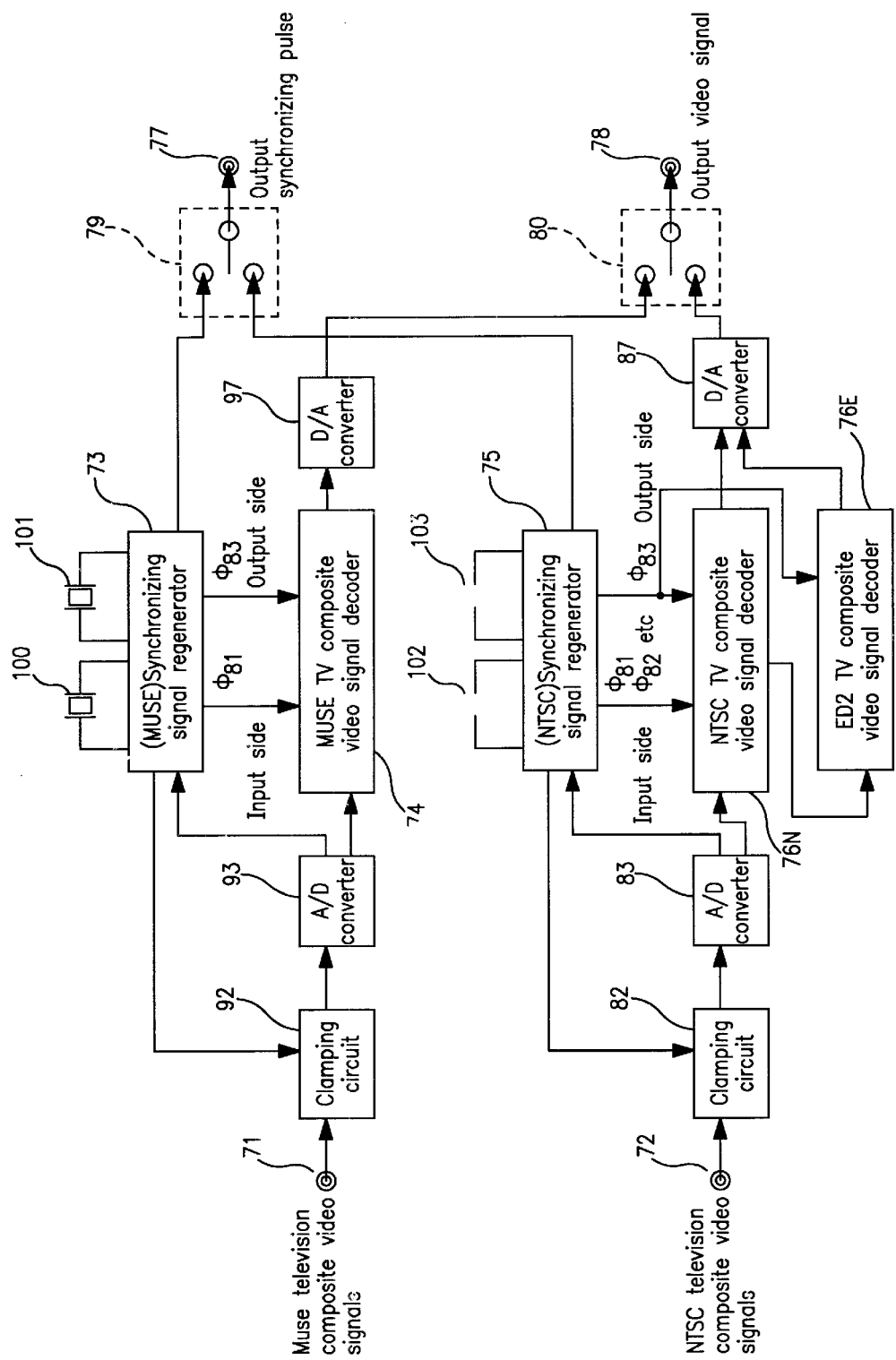
FIG. 6 is a block diagram of the conventional video signal processing apparatus for receiving and processing the NTSC television composite video signal and the MUSE television composite video signal.

Meanwhile, the digital video signal which has been input to the programmable processor 4 is decoded according to the format of the input video signal. FIG. 5 is a preferred embodiment of a block diagram of the programmable processor. A processing element 50 is aligned in matrix based on MIMD (Multiple-Instruction Multiple Data stream) system, and each processing element 50 is connected by lattice network wiring. The processing element 50 comprises an arithmetic and logic unit (ALU), an instruction register which controls the ALU, and a data register for inputting numerical values. Each register is connected to the CPU 12 by an exclusive wire so that methods of signal processing are dynamically changeable by rewriting the register according to the standard of input video signal or type of decode mode.

Table 1 is a comparison between the signal process of programmable signal processors and each signal format.

As shown in Table 1, the programmable signal processor 4 separates Y/C, decodes the chrominance signal, and processes ACC for decoding NTSC TV composite video signals. For decoding ED2 TV composite video signals, the programmable signal processor 4 separates Y/C, decodes the chrominance signal, processes ACC, and processes the horizontal high-emphasis signal (HH). The input system clock pulses $\phi 29$ are used for these processes. For decoding MUSE TV composite video signals, the programmable signal processor 4 interpolates the still picture region and moving picture region of the signal, detects motion, and processes progressive scanning.

Signals decoded with the programmable signal processor 4 are written into the memory 5 for synchronizing with the system clock pulse for display. In general, regardless of asynchronous or synchronous processing, a readable/writable memory (so-called read modified write) is used for sending and receiving digital signals between circuits operated by different system clock signals. The write address for the memory 5 is formed by the input system clock pulse $\phi 29$ generated from the input synchronizing signal processor 8 which generates an input synchronizing signal and a range of pulses synchronized to it.

TABLE 1

|  | NTSC<br>TV composite video signal<br>Decoding | ED2<br>TV composite video signal<br>Decoding | MUSE<br>TV composite video signal<br>Decoding |
|---|---|---|---|
| Programmable<br>signal processor<br>4 | YE separation<br><br>Chrominance signal<br>decoding<br>ACC process | YE separation<br><br>Chrominance signal<br>decoding<br>ACC process<br>HH regeneration | Interpolation in still<br>picture region<br>Interpolation in moving<br>picture region<br>Motion detection<br>Progressive scanning<br>process |
| Programmable<br>signal processor<br>6 | Line signal<br>interpolation<br><br>Caption signal insertion | Line signal<br>interpolation<br>VT/VH regeneration<br>Caption signal insertion<br>Picture quality<br>compensation | Picture quality<br>compensation |

Figure 3:
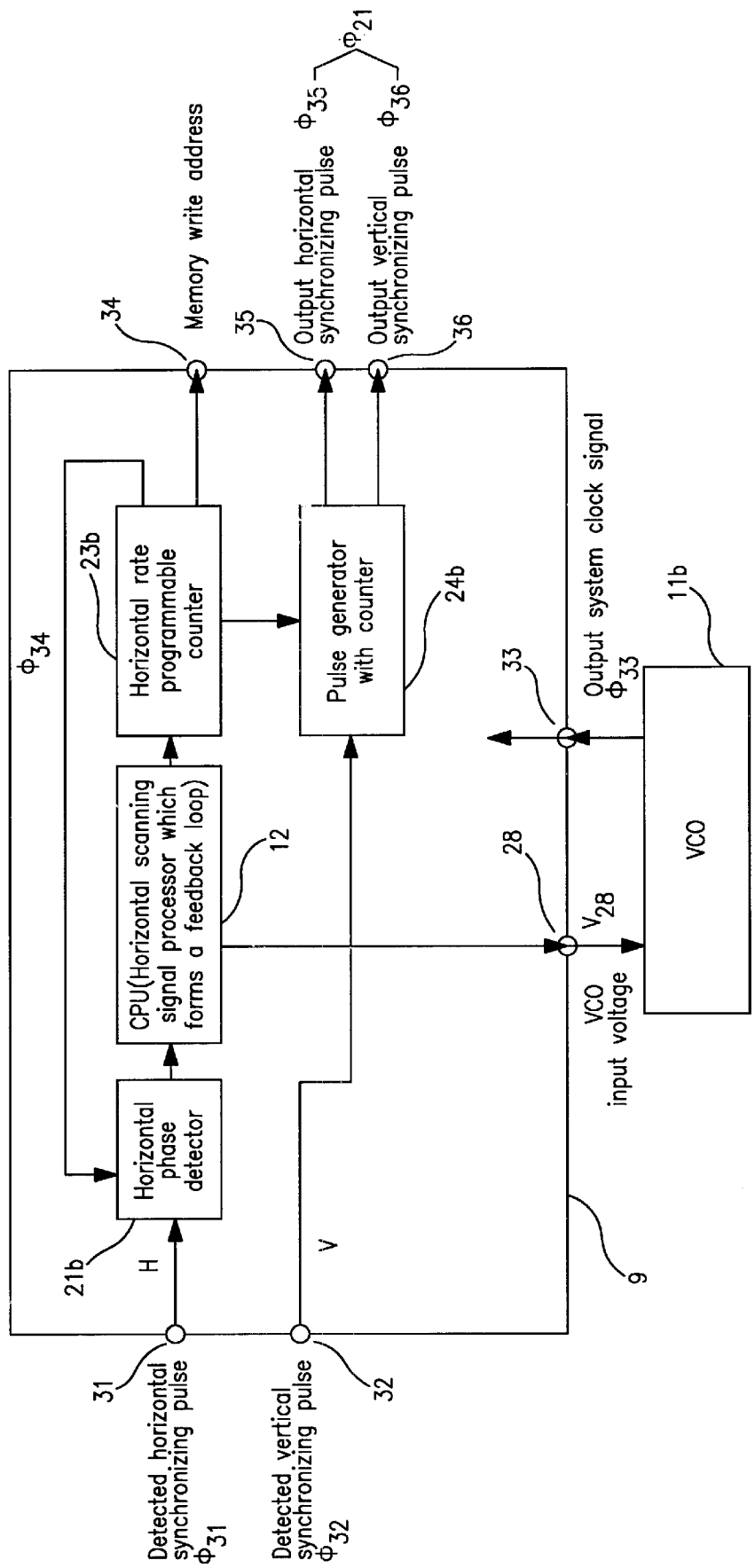
FIG. 3 is a block diagram of an output synchronizing signal processor of the video signal processing apparatus in FIG. 1.

Next, the output synchronizing pulse processor 9 is explained with reference to FIG. 3. The horizontal synchronizing signal φ31, vertical synchronizing signal φ32 and external synchronizing signal φ16 detected by the input synchronizing signal processor 8 form the phase-locked loop (PLL) for synchronizing the system clock for display to the external synchronizing signal φ16.

For picture-in-picture display TV sets, the external synchronizing signal φ16 uses the synchronizing signal of the video signal to be displayed in the main picture as the standard of the synchronizing pulse for display, and generate an address data, based on the standard, for storing the video signal to be displayed in the sub-picture in the memory 5. FIG. 2 and FIG. 3 omit signal processing of the external synchronizing signal, but the memory 5 can be synchronized to the external synchronizing signal just by switching over the write address. A write address generator is operated by field periodically, when inputting the external synchronizing signal, to absorb the difference in frame frequency. When inputting the internal synchronizing signal, the write address generator is operated by frame periodically. The picture-in-picture display is realized by writing two types of asynchronous digital video signals to the memory using the external synchronizing signal φ16, the input system clock pulse φ69 synchronized to the signal φ16, and the internal input system clock pulse φ29, and reading out the digital video signal from the memory 5 using the same system clock pulses for display.

For NTSC composite video signals, it is necessary to match the number of clock pulses to the display width (number of picture elements) for every line because video signal processing, such as interpolation of horizontal scanning line signals, is executed by line. It is also necessary to generate a clock pulse phase-locked to the line frequency (horizontal scanning frequency). A horizontal phase detector 21b detects any phase error between the horizontal synchronizing pulse φ34 generated from a horizontal rate programmable counter 23b, which divides the approximately 28-MHz clock to 1/1820, and the detected horizontal synchronizing pulse φ31. The detection result is calculated with the CPU 12 to convert the result to voltage, and it is output as V28 from the input voltage terminal 28 to control the oscillation frequency of a VCO 11b. The VCO 11b adds the output system clock φ33, synchronized to the horizontal scanning frequency of display apparatus, to the horizontal programmable counter 23b to form a feedback loop. The synchronizing pulse processor for display apparatus 9 always operates with reference to the output system clock φ33 as a standard clock. In general, the time constant of said feedback loop is set very long to form a stable output system clock locked to the line frequency of the input video signal and to avoid the influence of jitters from the input horizontal synchronizing signal.

The horizontal rate programmable counter 23b which is controlled by the horizontal synchronizing pulse adjusts the output horizontal scanning rate pulse to the required phase and pulse width using a pulse generator with counter 24b, and outputs the pulse as a horizontal synchronizing pulse 35 for display. In the same way, the pulse generator with counter 24b adjusts the phase and pulse width of the detected vertical synchronizing pulse and outputs it as a vertical synchronizing pulse φ36.

For MUSE TV composite video signals, the frequency of the system clock signal φ33 for display is approximately 44 MHz and the dividing ratio used in the horizontal rate programmable counter 23b controlled by the horizontal synchronizing pulse is 1/1320.

The VCO 11a and VCO 11b are variable oscillators adjustable from about 10 MHz to 50 MHz in order to correspond to wideband output signals.

The read-out address of the memory 5 is created in the output synchronizing pulse processor 9. For NTSC TV composite video signals and MUSE TV composite video signals, the line memory is used to process video signals by line and convert read-out phase and frequency using the output system clock φ33.

The programmable signal processor 6 decodes the composite video signal using the output system clock φ33 and the output synchronizing pulse. As shown in Table 1, for decoding NTSC TV composite video signals, processes including line signal interpolation, caption signal insertion, and picture quality compensation are executed. For decoding ED2 signals, processes including line signal interpolation, regeneration of vertical temporal-emphasis processing signal (VT) or vertical high-emphasis processing signal (VH), caption signal insertion, and picture quality compensation are executed.

Multiple signal processing programs are stored in the ROM, and the CPU 12 loads the required program for decoding video signals into the instruction register of the programmable signal processor depending on the type of video signal detected. Decoded composite video signals are converted to analog signals via the digital-to-analog converter 7, and output as video signals for display. At the same time, the output synchronizing pulse processor 9 generates a synchronizing pulse φ18 is which is shaped to the pulse waveform.

Figure 4:
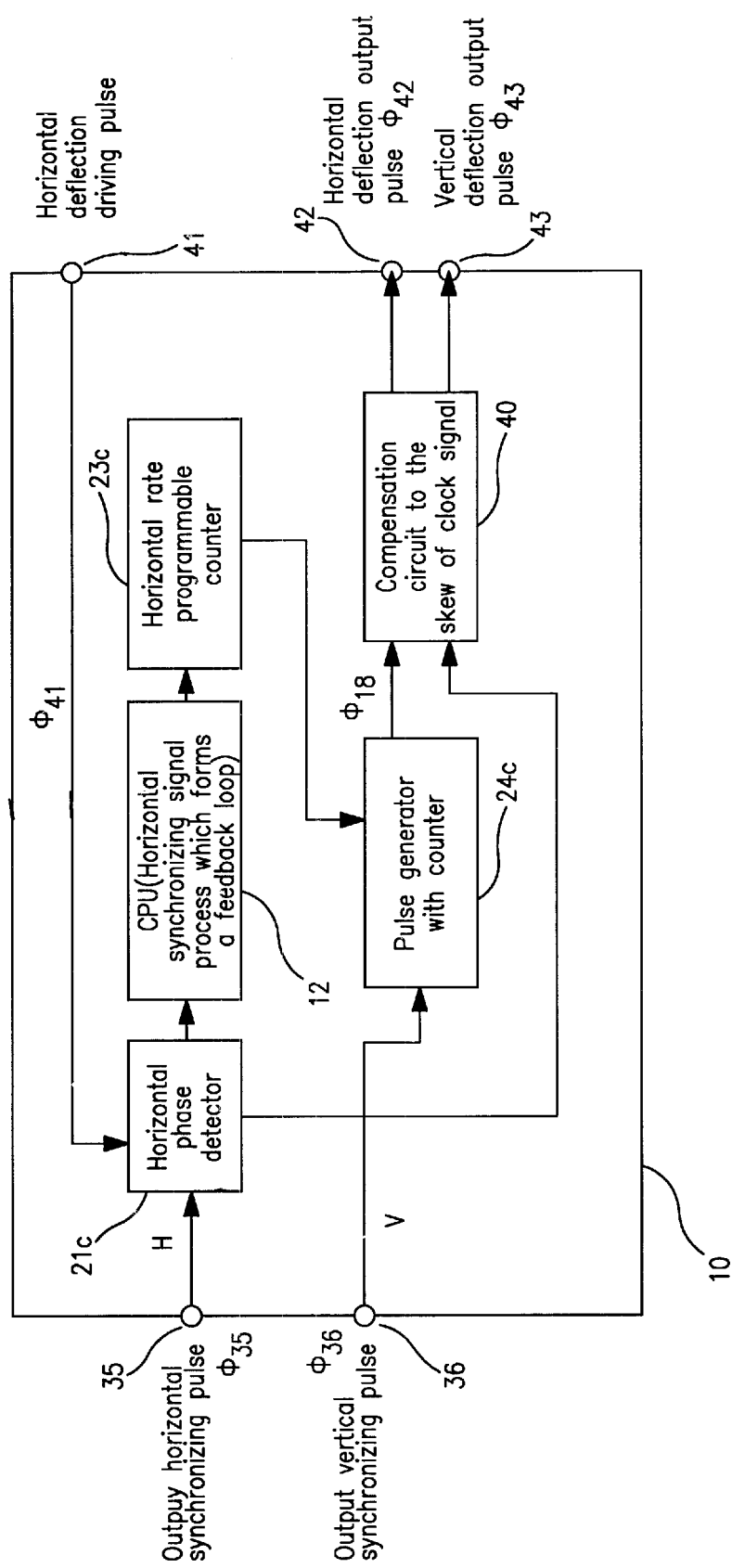
FIG. 4 is a block diagram of an output deflection signal generator of the video signal processing apparatus in FIG. 1.

FIG. 4 illustrates a deflection signal generator 10. When the display apparatus is a cathode ray tube (CRT), the pulses driving the horizontal output transistor are fed back to a horizontal phase detector 21c and form a PLL circuit comprising the horizontal synchronizing pulse to stabilize the special operation of the horizontal deflection circuit for CRT. The horizontal phase detector 21c detects any frequency or phase errors between the output horizontal synchronizing pulse φ35 and the pulses driving the horizontal output transistor φ41 for deflection. The detection result is input to the CPU 12, which contains a horizontal scanning signal processor which forms a feedback loop to calculate any phase error. The value to compensate for the calculated phase error is set as the dividing ratio to a horizontal rate programmable counter 23c. Next, the pulse generator with counter 24c adjusts the phase and pulse width of the output of the horizontal rate programmable counter 23c. Since the above processes are executed in a unit of the system clock for display, any phase error below the clock rate of the system clock for display φ33 is ignored. (In other words, the system does not respond to such phase error.) A compensation circuit to the skew of clock signal 40 compensates continuously, in analog, the phase error calculated by the horizontal synchronizing signal processor forming a feedback loop in the CPU 12, amplifies the pulse waveform of the generated horizontal frequency, and outputs it as the horizontal deflection output pulse φ42. The pulse generator with counter 24c shapes the waveform of the vertical synchronizing output pulse φ36 and outputs it as the vertical deflection output pulse φ43. Depend on the horizontal deflection output pulse φ42 and the vertical deflection output pulse φ43. By programmably switching operation of the deflection circuit according to the standard of video signals to be displayed, multiple display formats can be accepted.

The present invention has programmable signal processors connected to the input terminal and the output terminal of the memory, thereby enabling one video signal processor to process video signals of many different broadcasting systems which have different synchronizing signal frequencies, field frequencies, and sampling frequencies, and data signals composed of composite synchronizing signals which have different sampling frequencies.

What is claimed is:

1. A video signal processing apparatus for use with a display apparatus and an input video signal having one of a plurality of signal formats comprising:

means for generating and separating a synchronizing signal from said input video signal;

a clock signal generator for generating a clock signal phase-locked to a phase of said input video signal;

means for detecting which format of said plurality of signal formats corresponds to said input video signal;

an output system clock signal generator for generating i) a synchronizing pulse to display the decoded input video signal on the display apparatus and ii) an output system clock signal which is phase-locked with said synchronizing pulse;

a memory which stores a plurality of programs for processing the video signal by a signal processor;

control means for selecting a program for decoding the input video signal stored in said memory based on the detected format of the input video signal; and a first signal processor for decoding said input video signal using said selected program and producing an output video signal;

storage means for storing the output video signal of said first programmable signal processor; and a second signal processor for processing an output signal from said storage means using said selected program, wherein the second signal processor uses a frequency twice the frequency of the synchronizing signal of the input video signal.

2. A video signal processing apparatus as defined in claim 1, wherein said output system clock signal generator generates a clock signal phase-locked to an external synchronizing signal.

3. A video signal processing apparatus as defined in claim 1, wherein said clock signal generator comprises a voltage controlled oscillator (VCO) to output a clock signal of more than one frequency.

4. A video signal processing apparatus as defined in claim 1, wherein the display apparatus is a cathode ray tube comprising:

a signal processor for deflecting the output with reference to the system clock signal from the output system clock signal generator;

a memory which stores multiple programs; and selecting means for selecting a program stored in said memory depending on the format of the input video signal.

5. A video signal processing apparatus for use with a video signal having one of a plurality of signal formats comprising:

at least a first and second signal processor for i) recognizing which format of said plurality of signal formats corresponds to said video signal and ii) processing the video signal based on the signal formats;

a CPU;

storage means, said first signal processor is connected to an input of said storage means and said second signal processor is connected to an output of said storage means so that a program for decoding and processing said video signal is selected which corresponds to the recognized format of the input video signal and input to at least one of said first and second signal processor; and said first signal processor including a plurality of processing elements aligned in a matrix with each processing element including an arithmetic and logic (ALU) unit, an instruction register which controls the ALU unit, and a data register for inputting numerical values, with each register connected to the CPU so that signal processing is dynamically changeable by rewriting the data register.

6. A video signal processing apparatus for use with a display apparatus and an input video signal having one of a plurality of signal formats comprising:

means for generating and separating a synchronizing signal from said input video signal;

a clock signal generator for generating a clock signal phase-locked to a phase of said input video signal;

means for detecting which format of said plurality of signal formats corresponds to said input video signal;

an output system clock signal generator for generating i) a synchronizing pulse to display the decoded input video signal on the display apparatus and ii) an output system clock signal which is phase-locked with said synchronizing pulse;

a memory which stores a plurality of programs for processing the video signal by a signal processor;

control means for selecting a program for decoding the input video signal stored in said memory based on the detected format of the input video signal; and a first signal processor for decoding said input video signal using said selected program and producing an output video signal;

storage means for storing the output video signal of said first programmable signal processor; and a second signal processor for processing an output signal from said storage means using said selected program;

wherein two video signals, having a synchronizing signal f1 and f2, respectively, are displayed on one of a split screen and overlay screen of the display apparatus using the output system clock phase-locked to the f2 synchronizing signal;

where:
 f1 is a frequency of the synchronizing signal of the input video signal processed by the first programmable signal processor and
 f2 is an external frequency input having a frequency different from f1.

7. A video signal processing apparatus as defined in claim 6, wherein said output system clock signal generator generates a clock signal phase-locked to an external synchronizing signal.

8. A video signal processing apparatus as defined in claim 6, wherein said clock signal generator comprises a voltage controlled oscillator (VCO) to output a clock signal of more than one frequency.

9. A video signal processing apparatus as defined in claim 6, wherein the display apparatus is a cathode ray tube comprising:

a signal processor for deflecting the output with reference to the system clock signal from the output system clock signal generator;

a memory which stores multiple programs; and selecting means for selecting a program stored in said memory depending on the format of the input video signal.

* * * * *